Jan. 1, 1963   G. J. HANGGI ETAL   3,071,686
METHOD AND APPARATUS FOR LOW TEMPERATURE ANALYSIS
Filed Feb. 9, 1960   3 Sheets-Sheet 1

INVENTORS.
FRANK H. MEYER
GEORGE J. HANGGI
BY   DOYLE W. McCULLOCH

Jerome B. Peterson
ATTORNEY

INVENTORS.
FRANK H. MEYER
GEORGE J. HANGGI
BY  DOYLE W. McCULLOCH

Jerome B. Peterson
ATTORNEY

Jan. 1, 1963  G. J. HANGGI ETAL  3,071,686
METHOD AND APPARATUS FOR LOW TEMPERATURE ANALYSIS
Filed Feb. 9, 1960  3 Sheets-Sheet 3

INVENTORS.
FRANK H. MEYER
GEORGE J. HANGGI
BY DOYLE W. McCULLOCH

Jerome B. Peterson
ATTORNEY

United States Patent Office 3,071,686
Patented Jan. 1, 1963

3,071,686
METHOD AND APPARATUS FOR LOW
TEMPERATURE ANALYSIS
George J. Hanggi, 1721 Little Lane, Ponca City, Okla.;
Doyle W. McCulloch, 643 E. Bridges, Blackwell, Okla.;
and Frank H. Meyer, 70 Elmwood, Ponca City, Okla.
Filed Feb. 9, 1960, Ser. No. 5,335
13 Claims. (Cl. 250—51)

This invention relates to a method and apparatus for the analysis of normally-fluid materials. More particularly, the invention relates to a method and apparatus for freezing a fluid sample, pivoting the sample to a position suitable for analysis, and maintaining it in a solid state during analysis thereof. This application is a continuation-in-part of our application Serial No. 638,030, filed February 4, 1957, entitled "Sample Holder for Low Temperature Analysis," now abandoned.

In the X-ray study of substances which are normally fluid at atmospheric conditions it is sometimes necessary to freeze the sample and maintain it in a solid form for a number of minutes. X-ray diffraction is not effective in the analysis of fluid samples, and in such cases it is necessary to freeze the sample prior to analysis thereof. In theory-X-ray spectrography may be used to analyze a fluid sample, but since the commercial apparatus requires that the sample be tilted from the horizontal plane, a problem is presented in maintaining the sample in the horizontal plane. One suggested solution to this problem, in spectrography, is the use of a thin film of transparent medium over the fluid sample to prevent it from spilling from the holder while the holder is tilted for analysis. This solution is not effective, however, for the analysis for elements of atomic numbers of 11–21, because at the wave length required for such elements, the transparent film will absorb too much of the energy of the X-rays.

It is therefore desirable, in both diffraction and spectrum analysis of normally-fluid materials, both liquids and gases, to provide for the freezing of the sample, followed by the tilting of the frozen sample to a position suitable for analysis.

Accordingly, it is an object of the invention to provide a convenient and effective apparatus for freezing a fluid sample so that an analysis may be obtained.

It is a further object of the invention to provide a convenient and effective apparatus for moving the sample into position for analysis.

It is still a further object of the invention to provide effective means for maintaining the sample in a solid state and at a constant temperature during analysis.

It is still a further object of the invention to provide effective means for preventing the formation of frost and other forms of condensation on the sample.

It is still a further object of the invention to provide means whereby different coolant temperatures may be obtained.

It is still a further object of the invention to provide means whereby a sample of appreciable size may be analyzed.

Various other objects and advantages of the invention will become apparent from the following detailed description taken in conjunction with the accompanying drawings in which:

Broadly stated, our invention comprises a method of analyzing a normally-fluid sample comprising the steps of freezing the sample in a substantially horizontal position, pivoting the sample vertically to a position suitable for the analysis thereof, and maintaining the sample in a frozen condition during analysis thereof.

Suitable apparatus for the practice of our invention comprises a system for supplying a refrigerant to a sample holder, and a sample holder designed and adapted to pivot vertically from a substantially horizontal position such that it may hold a fluid sample to a position such that the sample may be analyzed while frozen.

Our invention may be used in conjunction with any commercial X-ray diffraction or spectrographic unit wherein it is necessary to employ a frozen sample, and is particularly applicable in conjunction with a unit wherein the sample must be maintained in a position other than horizontal during analysis.

Figure 1:
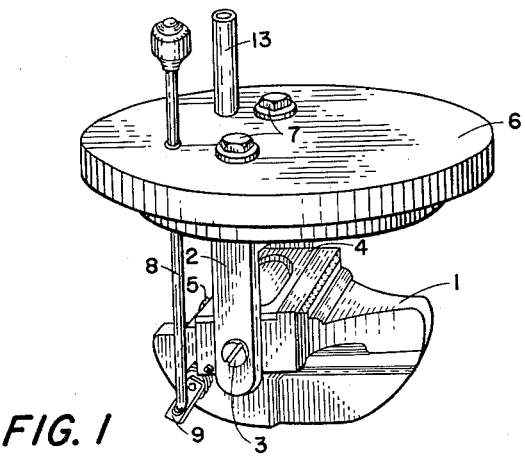
FIGURE 1 is a perspective view of one embodiment of the invention suitable for use in X-ray diffraction analysis.
Figure 2:
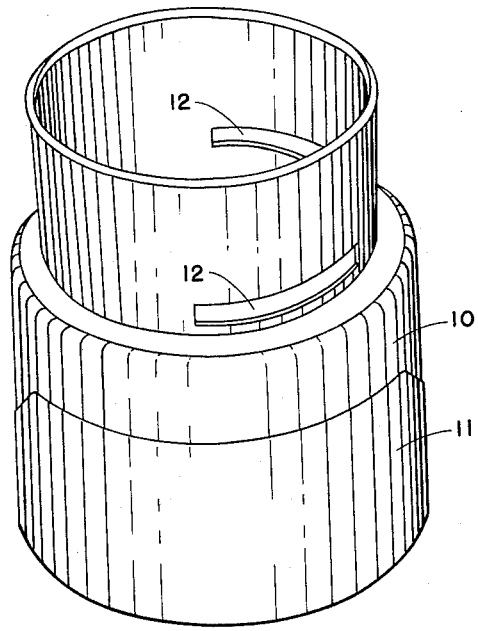
FIGURE 2 is a perspective view of the coolant container of the embodiment of FIGURE 1.
Figure 3:
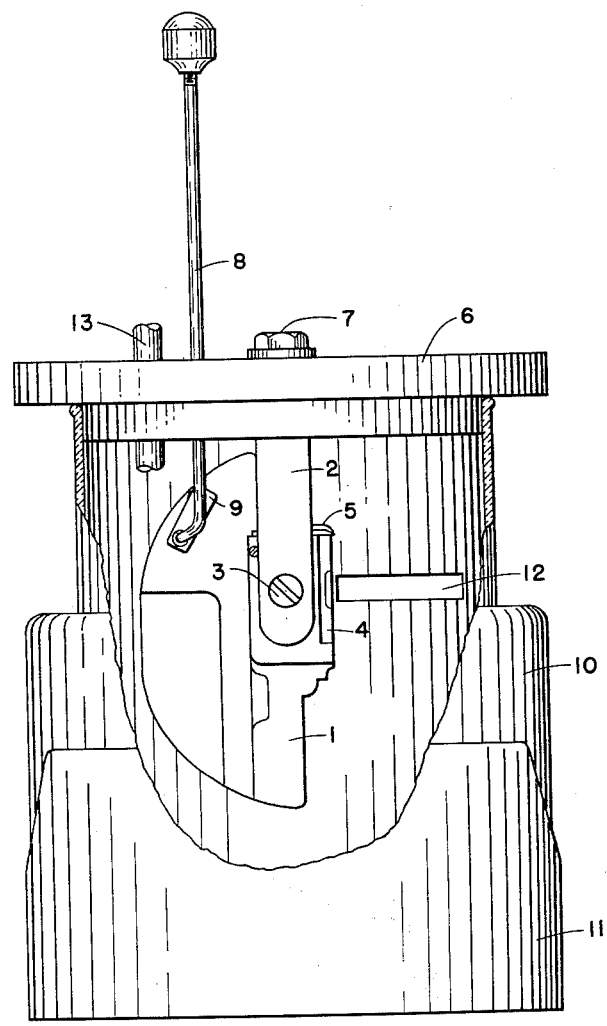
FIGURE 3 is a side view of the assembled apparatus of FIGURE 1, in position for analysis, with a portion of the coolant container broken away to show more clearly the details of the portion of the apparatus.

Referring now to FIGURES 1, 2, and 3 of the drawings in detail, the apparatus consists of a metallic heat conductor 1 pivotally secured to frame 2 at points 3, a sample holder 4 secured to the metallic heat conductor by means of spring clips 5, a cover 6 fastened to frame 2 at points 7, a positioning rod 8 pivotally secured to the heat conductor by means of arm 9, a coolant container 10 contained in a base 11, and slits 12.

The material used to construct the metallic heat conductor may be any metal of high thermal conductivity, copper and aluminum being of particular applicability. The particular shape of the metallic heat conductor is not critical, so long as it is designed and adapted to be immersed in at least substantial part in the liquid coolant in both the horizontal position for filling and the vertical position for testing.

The design and construction of the coolant container 10 is not critical, and any sufficiently insulated container of suitable size may be used. The container described in FIGURES 2 and 3 is a double-wall glass vessel of the Dewar type, having a vacuum space between the walls thereof. The upper portion of the container 10 defines a chamber through which nitrogen gas communicates with the sample.

Although the design of the sample holder 4 is not critical, it is desirable to use a standard rectangular sample holder as used generally in the art.

Operation of the apparatus is preceded by introduction of a liquid coolant material into the coolant container 10, to a level just below the slits 12. This coolant is preferably liquid nitrogen but may be any coolant having properties suitable to the practice of the invention. A tube 13 may be provided to facilitate introduction of liquid coolant into the container.

The sample holder 4, while in a horizontal position as indicated in FIGURE 1, is filled with the material to be analyzed. Then the apparatus shown in FIGURE 1 is placed into the coolant container 10, whereby the metallic heat conductor 1 is partially immersed in the liquid coolant. The sample is thereby rapidly chilled. When the sample is frozen, the positioning rod 8 is raised so that the metallic heat conductor and sample are pivoted to a vertical position ready for analysis ready for analysis, as shown in FIGURE 3, in which position the metallic heat conductor is still substantially immersed in the liquid coolant, and the sample is maintained in a solid state.

In many instances it may be necessary to grind the frozen sample to a powder prior to analysis, in order to obtain satisfactory diffraction data. In such cases the sample may be first frozen by any convenient means, ground to a powder, and placed in the sample holder. During these processes of grinding the sample and placing it in the sample holder, the frozen powdered sample will probably become partially melted. At this point the sample may be refrozen and placed into position for analysis by the procedure outlined above; that is, by securing the sample holder in the metallic heat conductor while in a horizontal position, placing the metallic heat conductor apparatus in the coolant container so that the metallic heat conductor is substantially immersed in the liquid coolant, allowing the partially melted sample to resolidify, and then pivoting the metallic heat conductor and sample holder into position for analysis.

X-rays from a suitable source are introduced through one of the slits 12, are directed so as to impinge upon the frozen sample, are diffracted slightly, and pass out through the other slit. The amount of diffraction, as measured by standard apparatus, may be used, in a manner known in the art, to determine certain chemical and physical characteristics of the sample under study. One specific type of machine with which our invention may be used is the XRD type of diffraction apparatus with spectrogoniometer manufactured by General Electric Company. The apparatus comprising our invention may be mounted in place of the sample holder support of the spectrogoniometer, by any convenient means, in such manner that the X-rays will impinge upon the sample when the holder is mounted in a vertical position in the metallic heat conductor.

One of the advantages of liquid nitrogen as coolant is that formation of frost on the sample is prevented by the vapor of the evaporating liquid nitrogen. This bathing action is also dependent on the design of the apparatus, being such that substantial quantities of air do not reach the sample, the design shown in FIGURES 1, 2, and 3 being adequate in this respect; however, if necessary to prevent substantial frosting or excessive boiling of the nitrogen under unusual conditions, shutters may be provided to block off additional portions of slits 12.

Figure 4:
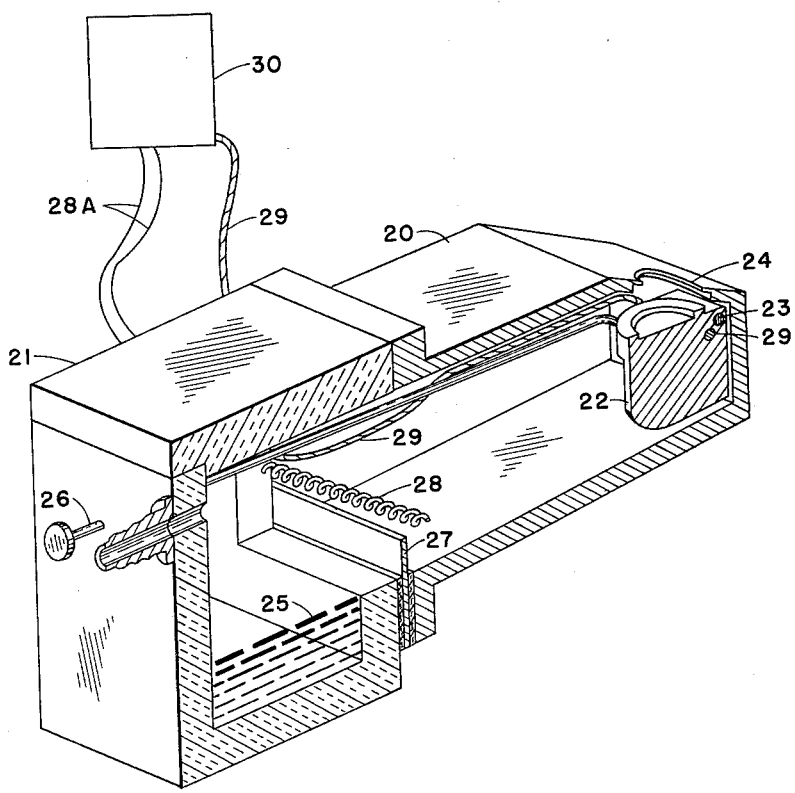
FIGURE 4 is a perspective view of another embodiment of the invention particularly suited to X-ray spectrography.

Another embodiment of the invention is illustrated in FIGURE 4 wherein chamber 20 is secured to insulated container 21 in communication therewith. A sample holder 22 is pivotally mounted on pin 23 in the chamber in such a manner that the holder may be pivoted from a horizontal position as shown in FIGURE 4, to a position against opening 24 for analysis.

Sample holder 22 is preferably made of a heat conducting metal although, if the required temperatures are not extremely low, other materials may be employed.

A liquid coolant 25 such as liquid nitrogen is placed in the container 21, and a sample of the fluid material to be analyzed is placed in the sample holder 22 while the sample holder is in the horizontal position as shown in FIGURE 4. When the sample has become frozen, the sample holder is pivoted (throughout an angle of about 45° in the embodiment shown in FIGURE 4) to a position suitable for analysis. A rod 26 or other suitable means is provided to facilitate pivoting of the sample holder from one position to the other from the outside of the apparatus.

Baffle 27 may be inserted to prevent flow of liquid coolant into the chamber 20, or, if extremely low temperatures are required, baffle 27 may be omitted thereby permitting liquid coolant to flow into chamber 20 to provide direct cooling of the sample holder 22 in both the freezing and the analyzing positions.

The chamber 20 of FIGURE 4 may include an opening (not shown) to provide a flow of gaseous coolant through the chamber 20 and into contact with the sample holder 22. If desired, a shutter for opening 24 may be provided so that the opening may be closed while the sample holder is in the horizontal position during freezing of the sample. If desired, a clip (not shown) or other convenient device may be included to maintain the sample holder 22 in the position for analysis.

Preferably, the heating coil 28 (supplied by leads 28A) is included in order that a wide range of temperatures will be available. In such case a flexible thermocouple 29 is attached to sample holder 22, to provide a measure of the temperature of the sample. The thermocouple is connected to a controller 30 for controlling the heat supplied to heating coil 28 and for maintaining the sample at a constant temperature.

Another method of chilling the sample is by supplying a refrigerant to a hollow sample holder or through closed coils surrounding the sample holder rather than by contacting a solid sample holder with coolant liquid or gas.

An additional method of chilling the sample, but not to the low temperatures previously described, is by means of mechanical refrigeration rather than liquid nitrogen. In the utilization of mechanical refrigerating units, which are commercially available, the coils of the evaporator may be immersed in a bath such as brine, in the coolant container. Control of the temperature may be obtained by means of a back-pressure valve, also available commercially. A source of nitrogen gas to the container would be used to provide the necessary inert atmosphere.

The cooling method of the preceding paragraph is designed to offer a wide range of cooling temperatures. Temperatures higher than ambient may be obtained by reversing the mechanical refrigeration cycle, whereby the coils would act as condenser rather than evaporator.

While the illustrated apparatus is primarily designed for X-ray diffraction or spectrometric analysis, it is obvious that the invention may be used to advantage in other systems wherein it is necessary to solidify and maintain in a solid state a normally liquid material. For example, a device embodying our invention may be employed in the field of low temperature physics, particularly in the investigation of the magnetic or other properties of materials by neutron diffraction techniques.

It is to be understood that the form of our invention, herewith shown and described, is to be taken as a preferred example of the same and that various changes in the shape, size, materials of construction, and arrangement of parts may be resorted to, without departing from the spirit of our invention, or the scope of the subjoined claims.

We therefore, particularly, point out and distinctly claim as our invention:

1. Apparatus for the low-temperature analysis of a normally-fluid material comprising: a heat-insulated container for a liquid coolant; a chamber connected to said container and communicating therewith; and a sample holder pivotally mounted in said chamber with the axis of rotation in a substantially horizontal direction, said sample holder being designed and adapted to rotate upwardly from a substantially horizontal first position to a second position suitable for analysis of a sample in said sample holder, and being designed and adapted so that it may be at least partially immersed in a liquid coolant in said container while in each of said positions.

2. The apparatus of claim 1 in which the second position is substantially vertical.

3. The apparatus of claim 1 in which the second position is about 45° from the first position.

4. The apparatus of claim 2 including means operable from the outside of the apparatus for pivoting the sample holder from the first position to the second position.

5. The apparatus of claim 3 including means operable from the outside of the apparatus for pivoting the sample holder from the first position to the second position.

6. Apparatus for the low-temperature analysis of a normally-fluid material comprising: a heat-insulated container for a liquid coolant; a chamber extending horizontally from one side of said container and in open communication therewith; a heat-conducting sample holder pivotally secured to said chamber with the axis of rotation in a substantially horizontal direction; said sample holder being designed and adapted to rotate upwardly from a substantially horizontal first position through an angle of about 45° to a second position suitable for analyzing a sample in said sample holder; and an opening in said chamber for exposure of the sample to X-rays.

7. The apparatus of claim 6 including means connected to said sample holder for maintaining the sample at a substantially constant temperature.

8. Apparatus for use in the low-temperature diffraction analysis of a normally-fluid material comprising: a heat-insulated container for a refrigerating liquid; a cover for said container; a metallic heat conductor pivotally suspended in the upper portion of said container, the axis of pivot being aligned in a horizontal direction, said conductor being pivotable from a horizontal to a vertical position and being designed and adapted to be at least partially immersed in a refrigerating liquid in both the horizontal and the vertical positions; means for pivoting said metallic heat conductor from said horizontal position to said vertical, said means being operable from the outside of the container; a sample holder secured to said metallic heat conductor; two openings opposite said sample holder for ingress and egress of a beam of rays to which said normally-liquid material is to be exposed during said diffraction analysis.

9. The apparatus of claim 8 in which said container is provided with means for introducing said refrigerating liquid into said container.

10. The apparatus of claim 9 further characterized in that the lower portion of said container is of double-walled vacuum-insulated construction.

11. Apparatus for use in the low-temperature diffraction analysis of a normally-fluid material comprising: a container having a double-walled vacuum-insulated lower portion and an upper portion containing two openings for ingress and egress of a beam of rays; a removable cover for said container; a frame secured to said removable cover extending down into said container; a metallic heat conductor pivotally secured to said frame, the axis of pivot being aligned in a horizontal direction, said conductor being pivotable from a horizontal to a vertical position and being designed and adapted to be at least partially immersed in a refrigerating liquid in both the horizontal and the vertical positions; means for pivoting said metallic heat conductor vertically from said horizontal position to said vertical position, said means being operable from the outside of the container; a sample holder secured to said metallic heat conductor; and means for introducing a fluid into said container.

12. The apparatus of claim 6 further characterized in that said sample holder is designed and adapted to be at least partially immersed in a liquid coolant in said chamber in both the horizontal first position and the second position.

13. The apparatus of claim 12 including means connected to said sample holder for maintaining the sample at a substantially constant temperature.

References Cited in the file of this patent

UNITED STATES PATENTS

| | | |
|---|---|---|
| 2,422,807 | Smith | June 24, 1947 |
| 2,436,676 | Smith et al. | Feb. 24, 1948 |
| 2,543,825 | Beu et al. | Mar. 6, 1951 |
| 2,826,701 | Columbe | Mar. 11, 1958 |

OTHER REFERENCES

Klug et al.: X-Ray Diffraction Procedures for Polycrystalline and Amorphous Materials, published by John Wiley & Sons Inc., New York, 1954, pp. 226 to 232.